United States Patent Office 3,458,533
Patented July 29, 1969

3,458,533
KETO-ACID DERIVATIVES OF BENZOFURANES AND THEIR PREPARATION
Pier Nicola Giraldi, Francesco Lauria, Alessandro Fojanesi, Giuliano Nannini, and Willy Logemann, Milan, Italy, assignors to Carlo Erba S.p.A., Milan, Italy, a corporation of Italy
No Drawing. Filed Apr. 11, 1966, Ser. No. 541,521
Claims priority, application Italy, Apr. 28, 1965, 4,051/65
Int. Cl. C07d 5/40, 5/42; A61k 25/00
U.S. Cl. 260—346.2                                    3 Claims

ABSTRACT OF THE DISCLOSURE

Keto-acids, having the general formula:

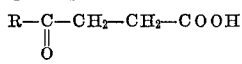

wherein R is

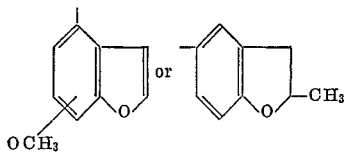

are prepared by reacting the appropriate methoxy-benzofurane or 2-methyl-2,3-dihydrobenzofuran with either succinic anhydride or the mono-esters of succinic acid chloride in a solvent and in the presence of a Friedel-Crafts catalyst, and finally saponifying the formed ester.

---

A benzofuranic derivative, useful for the treatment and prevention of hepatic conditions, has been isolated from the roots of the aquatic Cannabis (*Eupatorium cannabinum*).

Starting from this observation we have prepared some choleretics containing the benzofuranic and the 2,3-dihydrobenzofuranic ring.

The aim of the present invention is the preparation of keto-acids having the following general formula:

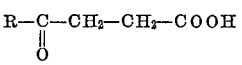

where R=

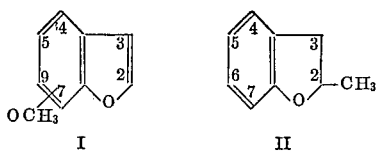

The keto-butyric chain is preferably inserted in the 4-position in the benzofuranic and 2,3-dihydrobenzofuranic derivatives and preferably in the 5-position in the 2-methyl-2,3-dihydrobenzofuran.

The compounds I and II are synthesized by reacting the corresponding methoxy-benzofuranes, methoxy-2,3-dihydrobenzofuranes and 2-methyl-2,3-dihydrobenzofuran with succinic anhydride in a solvent, in the presence of AlCl$_3$, SnCl$_4$ or one of the usual catalysts of the Friedel-Crafts reaction, or with the mono-ester of succinic acid chloride:

RO—CO—CH$_2$—CH$_2$—COCl (R=alkyl) in a solvent and in the presence of AlCl$_3$, SnCl$_4$ or one of the usual catalysts of the Friedel-Crafts reaction, and finally saponifying the formed ester.

These new products are useful medicinals because of their remarkable choleretic activity in animals and especially in humans.

The following examples clarify but do not limit the present invention.

EXAMPLE 1

(A) 7.4 g. (0.05 mole) of 7-methoxy-benzofurane, in 75 ml. of dry nitro-benzene, are added with 5.5 g. (0.055 mole) of succinic anhydride.

The mixture is cooled with ice bath, and 13.3 g. (0.1 mole) of AlCl$_3$ are added in 45 minutes.

The solution is maintained at room temperature and stirred for 24 hours. The complex is hydrolyzed with HCl 20% by cooling, then the nitro-benzene is distilled in steam stream. The residue, after decantation of water, is dissolved with NaHCO$_3$ 10%, decolorized with charcoal, filtered and precipitated with HCl 20%. The precipitate so obtained is filtered and crystallized from diluted ethanol to obtain the 7 - methoxy-benzofuranoyl-4-propionic acid (M.P. 160–162° C.).

In a similar way, starting from 7-methoxy-2,3-dihydrobenzofurane, the 7-methoxy-2,3-dihydrobenzofuranoly-4-propionic acid is obtained.

These acids are salified employing the usual methods with organic and inorganic bases to obtain the corresponding salts.

(B) 7.4 g. (0.05 mole) of 7-methoxy-benzofurane in 35 ml. of dry CS$_2$ are added with 8.2 g. (0.05 mole) of carboethoxy-propionyl chloride. The mixture is cooled at $-10°$ C., then 10 g. (0.075 mole) of AlCl$_3$ are added in about 15 minutes. The whole is brought to room temperature and stirred for 1 hour. The complex is hydrolyzed with HCl 20% by cooling and extracted with CHCl$_3$, drying on dry CaCl$_2$ and concentrating. An excess of KOH, alcoholic N/2, is added to the oily residue, and the mixture is refluxed on water-bath for 1 hour. The solution is evaporated to drying, then the residue is dissolved in water, decolorized with charcoal, filtered and acidified with HCl 20%. The precipitate so obtained is filtered and crystallized from diluted ethanol, to obtain 7-methoxy-benzofuranoyl-4-propionic acid (M.P. 160–162° C.).

In a similar way the 7-methoxy-2,3-dihydrobenzofuranoyl-4-propionic acid is obtained.

These acids are salified employing the usual methods with organic and inorganic bases, to obtain the corresponding salts.

EXAMPLE 2

To a solution containing 13.4 g. of 2-methyl-2,3-dihydrobenzofuran and 11 g. of succinic anhydride in 100 ml. of nitrobenzene, cooled to 0° C. are added little by little 26.6 g. of AlCl$_3$.

The reaction mixture is stirred for 5 hours at 5–10° C., then for one night at room temperature. The solution which is obtained is poured in water containing hydrochloric acid and the phase containing the desired product and nitrobenzene is steam distilled to remove the nitrobenzene.

Then the residue remaining after steam distillation is dissolved in NaOH 8%, decolorized with bone charcoal and precipitated with HCl 8%. The precipitate is filtered, dried and crystallized from benzene-petroleum ether to obtain (2-methyl-2,3-dihydrobenzofuranoyl)-5-propionic acid (M.P. 130–131° C.). This acid is salified employing the usual methods with organic and inorganic bases to obtain the corresponding salts.

We claim:
1. 7-methoxy-benzofuranoyl-4-propionic acid.

2. 7-methoxy-2,3-dihydrobenzofuranoyl-4-propionic acid.

3. 2-methyl-2,3-dihydrobenzofuranoyl-5-propionic acid.

References Cited

Cagniant et al.: Bull. Soc. Chim. France, pp. 827–37 (1957).

Bisagni et al.: Compt. Rendu., vol. 250, pp. 3339–41 (1960).

Cram, Donald, et al.: Organic Chemistry, McGraw Hill, New York, N.Y. (1959), p. 305.

ALEX MAZEL, Primary Examiner

BERNARD DENTZ, Assistant Examiner

U.S. Cl. X.R.

424—285